Feb. 26, 1963     J. A. N. CLEVERS     3,079,488

STUD WELDING

Filed Oct. 19, 1960

INVENTOR
J. A. N. CLEVERS

BY Frank R. Trifari

AGENT

United States Patent Office 3,079,488
Patented Feb. 26, 1963

3,079,488
STUD WELDING
Johannes Anthonius Nicolaas Clevers, Eindhoven, Netherlands, assignor to North American Philips Company, Inc., New York, N.Y., a corporation of Delaware
Filed Oct. 19, 1960, Ser. No. 63,647
Claims priority, application Netherlands Oct. 29, 1959
3 Claims. (Cl. 219—99)

My invention relates to stud welding and more particularly to a ferrule for use in such welding.

The term "stud-welding ferrule" as used herein is to be understood to mean an annular body of slag-forming material adapted to be positioned on the end of a metal stud, bolt or the like whose end is to be joined to a workpiece by means of electric arc welding.

It has been proposed to hold such ferrules to the end of the stud by separate members, such as collars of thick paper which engage the end of the stud. In a simpler and less expensive construction, such as described in Belgium Patent 568,482, the surface of the bore of the ferrule is tapered so that it can be secured to the end of the stud. I have found that, while ferrules having a tapered bore for gripping the stud give good results when used for studs having a diameter up to about 6 mms., they are unsatisfactory when used with studs of larger diameters. More particularly, when the stud is pressed into the tapered bore of the ferrule with sufficient pressure to ensure that the ferrule will be firmly attached thereto, the ferrule frequently disintegrates prematurely during the welding.

In accordance with the invention I overcome the above difficulties and provide a ferrule of simple and inexpensive construction which can be used with various size studs without danger of premature breakage by providing within the bore of the stud at least one inwardly-extending rib-shaped holding member having an inclined active surface adapted to engage the edge of the stud.

Although one holding member is usually sufficient I have found that, from the standpoint of symmetry and centering of the stud in the ferrule, it is preferable to use a plurality of, preferably two or three, members equally spaced apart.

The ferrules according to the invention eliminate any danger of premature breakage, because when the welding current is applied a portion of at least one of the holding members is immediately softened by the heat concentrated therein and thereby relieves lateral pressure upon the wall of the ferrule which otherwise would prematurely fracture the same.

Figure 1:
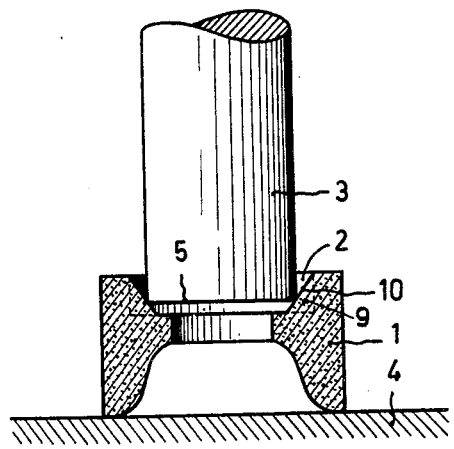
Figure 2:
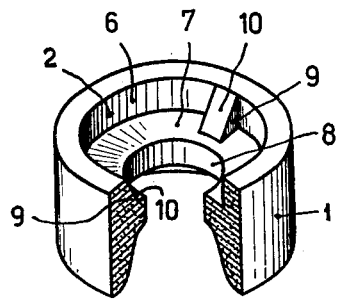

In order that my invention may be clearly understood and readily carried into effect, I shall describe the same in more detail with reference to the accompanying drawing in which:

FIGURE 1 is a sectional side view of a ferrule according to the invention attached to a stud and resting on a workpiece, and FIGURE 2 is a sectional perspective view of the ferrule of FIGURE 1.

The ferrule 1 shown in FIGURE 1 resting upon a workpiece 4 is an annular body molded from slag-forming material and baked to form a coherent body. The ferrule may be made of any of the materials usually used for this purposes, such as those described in U.S. Patents 2,833,914, 2,829,235 and 2,948,805.

Ferrule 1 is provided with cavity 2 having an annular side surface 6 and a ring-shaped bottom surface 7 (see FIG. 2). In accordance with the invention the ferrule is provided with two oppositely-disposed rib-shaped holding members 9 which form part of the molded body. Members 9 extend into cavity 2 and have active surfaces 10 inclined with respect to the axis of the ferrule. Members 9 have a width which generally varies with the size of the stud, but usually lies between about 2 mms. and 5 mms., whereas the surfaces 11 generally form an angle between about 3° and 12° with the axis of the ferrule.

The construction of the ferrule is shown in more detail in FIGURE 2 in which the left-hand section is taken through one of the members 9 and the right-hand section is taken at a point between the members.

Prior to the welding a stud 3 is forced into cavity 2 with sufficient pressure so that the edge of the end surface 5 will engage the inclined surfaces 10 of the members 9 and thereby hold the ferrule to the stud. The stud 3 with ferrule attached is then arranged on the workpiece as shown in FIGURE 1 whereupon the welding current is supplied to strike an electric arc between the end surface 5 and workpiece 4. If the ferrule 1 is made of electrically-conductive material, such as described in above-mentioned Patent 2,833,914, it may assist in striking the arc. As soon as the welding current is supplied considerable heat will be produced at the points where the edge of stud 3 engages the inclined surface of projections 9, which causes the portion of the projection 10 at these points to melt and thereby relieve any pressure which the stud exerts upon the ferrule and which might cause premature breakage of the latter.

While I have described my invention in connection with specific examples and constructions I do not desire to be limited thereto as obvious modifications will readily present themselves to one skilled in this art.

What is claimed is:

1. A stud-welding ferrule comprising an annular body of slag-forming material provided with a cavity adapted to receive the end of a stud, and means for temporarily holding the ferrule to a stud with a wedging action including a plurality of rib-shaped holding members each extending inwardly from the side of said cavity and having an inner active surface inclined with respect to the axis of the ferrule to thereby grip the end of the stud, said members being distributed around the periphery of the cavity.

2. A stud-welding ferrule comprising an annular body of slag-forming material provided with a cavity adapted to receive the end of a stud, and means for temporarily holding the ferrule to a stud with a wedging action including a plurality of rib-shaped holding members having a width of about 2 to 5 mms. each extending inwardly from the side of said cavity and having an inner active surface inclined at an angle of about 3° to 12° with respect to the axis of the ferrule to thereby grip the end of the stud, said members being distributed around the periphery of the cavity.

3. A stud-welding ferrule comprising an annular body of slag-forming material provided with a cavity adapted to receive the end of a stud, and means for temporarily holding the ferrule to a stud with a wedging action including a plurality of rib-shaped holding portions of the ferrule each extending inwardly from the side of said cavity and having an inner active surface inclined with respect to the axis of the ferrule to thereby grip the end of the stud, said members being distributed around the periphery of the cavity.

References Cited in the file of this patent

UNITED STATES PATENTS

| | | |
|---|---|---|
| 2,506,747 | Smith | May 9, 1950 |
| 2,510,000 | Willigen et al. | May 30, 1950 |
| 3,021,418 | Blink et al. | Feb. 13, 1962 |

FOREIGN PATENTS

| | | |
|---|---|---|
| 649,177 | Great Britain | Jan. 17, 1951 |